United States Patent
Yu et al.

(10) Patent No.: US 11,188,557 B2
(45) Date of Patent: Nov. 30, 2021

(54) SYSTEMS AND METHODS FOR AN END-TO-END VISUAL ANALYTICS SYSTEM FOR MASSIVE-SCALE GEOSPATIAL DATA

(71) Applicants: Jia Yu, Tempe, AZ (US); Zongsi Zhang, Tempe, AZ (US); Mohamed Sarwat, Tempe, AZ (US)

(72) Inventors: Jia Yu, Tempe, AZ (US); Zongsi Zhang, Tempe, AZ (US); Mohamed Sarwat, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 178 days.

(21) Appl. No.: 16/355,261

(22) Filed: Mar. 15, 2019

(65) Prior Publication Data

US 2019/0286635 A1    Sep. 19, 2019

Related U.S. Application Data

(60) Provisional application No. 62/643,353, filed on Mar. 15, 2018.

(51) Int. Cl.
| | |
|---|---|
| *G06F 16/26* | (2019.01) |
| *G06F 16/29* | (2019.01) |
| *G06F 16/9537* | (2019.01) |
| *G06T 11/20* | (2006.01) |
| *G06F 16/2453* | (2019.01) |
| *G06T 11/00* | (2006.01) |
| *G06F 16/248* | (2019.01) |

(52) U.S. Cl.
CPC ........... *G06F 16/26* (2019.01); *G06F 16/248* (2019.01); *G06F 16/24537* (2019.01); *G06F 16/24542* (2019.01); *G06F 16/29* (2019.01); *G06F 16/9537* (2019.01); *G06T 11/001* (2013.01); *G06T 11/206* (2013.01)

(58) Field of Classification Search
CPC ...... G06F 16/9537; G06F 30/20; G06F 16/26; G06F 16/24537
See application file for complete search history.

(56) References Cited

U.S. PATENT DOCUMENTS

| | | | |
|---|---|---|---|
| 9,892,125 B1* | 2/2018 | Mostak | G06F 16/13 |
| 10,719,554 B1* | 7/2020 | Davis | G06F 16/2365 |
| 2015/0261852 A1* | 9/2015 | Self | G06F 16/951 |
| | | | 707/754 |
| 2015/0347528 A1* | 12/2015 | Jugel | G06F 16/24535 |
| | | | 707/759 |
| 2017/0293635 A1* | 10/2017 | Peterson | G06F 16/2477 |
| 2017/0323028 A1* | 11/2017 | Jonker | G06F 16/9024 |

OTHER PUBLICATIONS

Aji, et al., Hadoop-GIS: A High Performance Spatial Data Warehousing System over mapReduce, PVLDB 6, 11 (2013), 1009-1020.
(Continued)

*Primary Examiner* — Albert M Phillips, III
*Assistant Examiner* — Courtney Harmon
(74) *Attorney, Agent, or Firm* — Polsinelli PC

(57) ABSTRACT

Various embodiments of an end-to-end visual analytics system and related method thereof are disclosed.

10 Claims, 16 Drawing Sheets
(12 of 16 Drawing Sheet(s) Filed in Color)

(a) GeoViz-aware partitioner (16 tiles, 50 partitions, maximum tile splitting level = 2)

(56) References Cited

OTHER PUBLICATIONS

Apache Spark Apache Spark homepage, http://spark.apache.org/ [Online] Available:—https://web.archive.org/web/20180228180150/http://spark.apache.org/.

Baig, et al., SparkGIS: Efficient Comparison and Evaluation of Algorithm Results in Tissue Image Analysis Studies. In Workshop on Biomedical Data Management and Graph Online Querying—VLDB (2015), pp. 134-146.

Battle, et al., Dynamic reduction of query result sets for interactive visualizaton. In Big Data (2013), IEEE, pp. 1-8.

Eldawy, et al., A demonstration of SpatialHadoop: An efficient mapreduce framework for spatial data. PVLDB 6, 12 (2013), 1230-1233.

Eldawy, et al., SHAHED: A MapReduce-based System for Querying and Visualizing Spatio-temporal Satellite Data. In ICDE (2015), IEEE, pp. 1585-1596.

Eldawy, et al., HadoopViz: A MapReduce Framework for Extensible Visualization of Big Spatial Data. In ICDE (2016), IEEE, pp. 601-612.

Hughes, et al., GeoMesa: a distributed architecture for spatio-temporal fusion. In SPIE Defense+ Security (2015), International Society for Optics and Photonics, pp. 94730F-94730F.

Kefaloukos, et al., Declarative cartography: In-database map generalization of geospatial datasets. In IEEE 30th International Conference on Data Engineering, Chicago, ICDE 2014, IL, USA, Mar. 31-Apr. 4, 2014 (2014), pp. 1024-1035.

Kini, et al., Geotrellis: Adding geospatial capabili-ties to spark. Spark Summit (2014). [Online] Available: https://databricks.com/session/geotrellis-adding-geospatial-capabilities-to-spark.

Kini, et al., YouTube presentation, Jul. 17, 2014. [Online] Available: https://www.youtube.com/watch?v=4HxoFRjSs4Q&feature=youtu.be.

Lins, et al., Nanocubes for real-time exploration of spatiotemporal datasets. TVCG 19, 12 (2013), 2456-2465.

Lu, et al., Parallel Secondo: Boosting Database Engines with Hadoop. In ICPADS (2012), p. 738-743.

Mahdian, et al., Algorithmic cartography: Placing points of interest and ads on maps. In Proceedings of the 21th ACM SIGKDD International Conference on Knowledge Discovery and Data Mining, Sydney, NSW Australia, Aug. 10-13, 2015 (2015), pp. 755-764.

Mostak, An overview of MapD (massively parallel database). White paper. Massachusetts Institute of Technology (2013).

OpenStreetMap. Open Street Map Zoom Level. http://wiki.openstreetmap.org/wiki/Zoom_levels, 20090. [Online] Available: https://web.archive.Org/web/20090522115422/https://wiki.openstreetmap.org/wiki/Zoom_levels.

Pahins, et al., Hashedcubes: Simple, low memory, real-time visual exploration of big data. TVCG (2017).

Park, et al., Visualization-aware sampling for very large databases. In ICDE (2016), IEEE.

Sarma, et al., Efficient spatial sampling of large geographical tables. In Proceedings of the ACM SIGMOD International Conference on Management of Data, SIGMOD 2012, Scottsdale, AZ, USA, May 20-24, 2012 (2012), pp. 193-204.

Satyanarayan, et al., Reactive vega: A streaming dataflow architecture for declarative inter-active visualization. IEEE Trans. Vis. Comput. Graph. 22, 1 (2016), 659-668.

Satyanarayan, et al., Vega-lite: A grammar of interactive graphics. IEEE Trans. Vis. Comput. Graph. 23, 1 (2017), 341-350.

Tang, et al., LocationSpark: A Distributed In-Memory Data Management System for Big Spatial Data. PVLDB 9, 13 (2016), 1565-1568.

Wang, et al., Spatial online sampling and aggregation. In VLDB (2015), vol. 9, VLDB Endowment, pp. 84-95.

Wu, et al., The case for data visualization management systems. PVLDB 7,10 (2014), 903-906.

Xie, et al., Simba: Efficient In-Memory Spatial Analytics. In SIGMOD (2016).

Yu, et al., GeoSpark: A Cluster Computing Framework for Processing Large-Scale Spatial Data. In ACM SIGSPA-TIAL GIS(2015).

Yu, et al., Indexing the pickup and drop-off locations of NYC taxi trips in PostgreSQL—Lessons from the road. In SSTD (2017), pp. 145-162.

\* cited by examiner (a) GeoViz-aware partitioner (16 tiles, 50 partitions, maximum tile splitting level = 2)

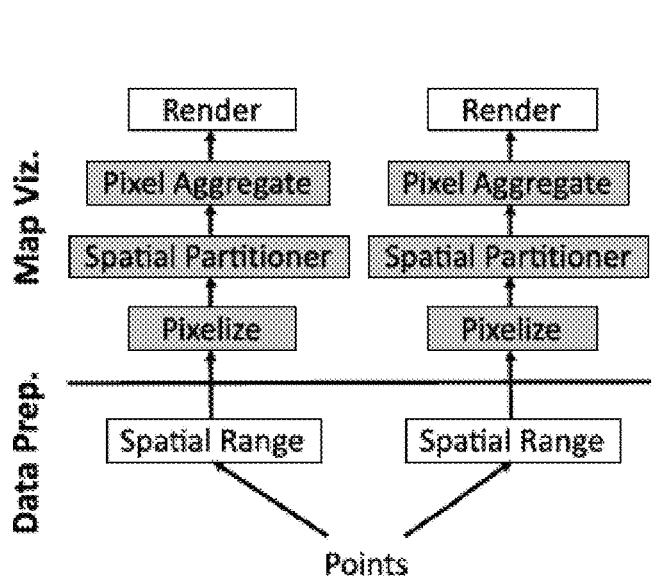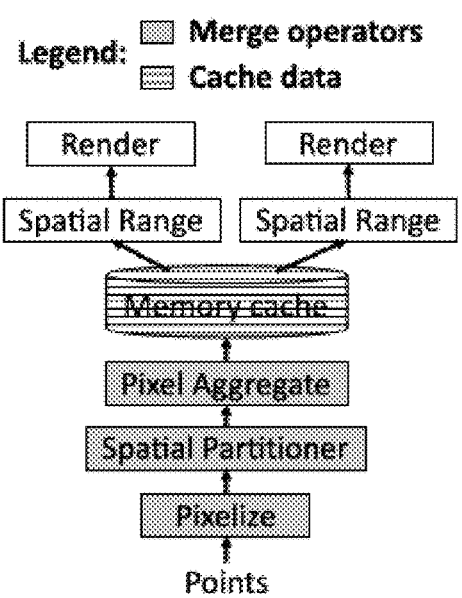
FIG. 6A
FIG. 6B

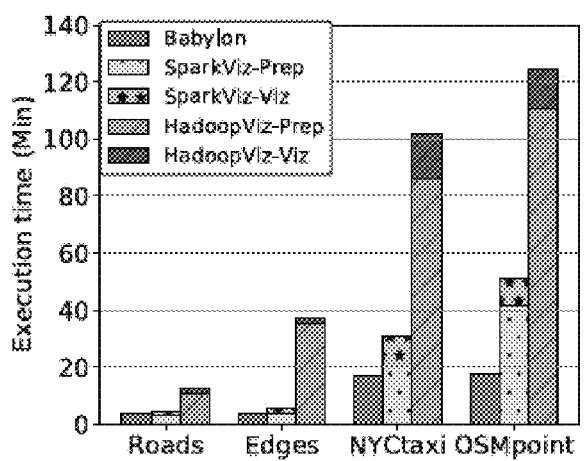 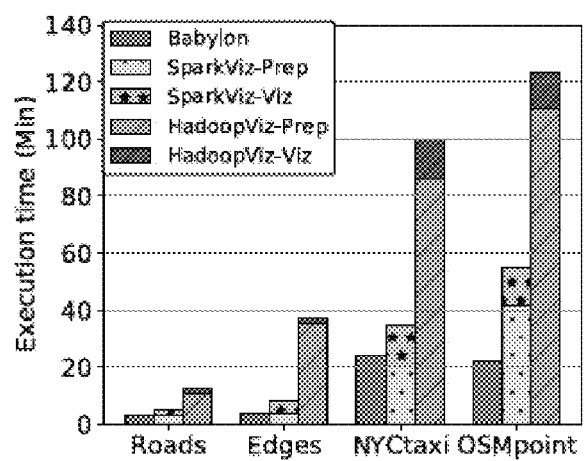
FIG. 11A                    FIG. 11B

SYSTEMS AND METHODS FOR AN END-TO-END VISUAL ANALYTICS SYSTEM FOR MASSIVE-SCALE GEOSPATIAL DATA

CROSS REFERENCE TO RELATED APPLICATIONS

This is a non-provisional application that claims benefit to U.S. provisional application Ser. No. 62/643,353 filed on Mar. 15, 2018 which is incorporated by reference in its entirety.

FIELD

The present disclosure generally relates to a visual analytics system and in particular to an end-to-end visual analytics system for massive-scale geospatial data.

BACKGROUND

GeoVisual analytics, abbr. GeoViz, is the science of analytical reasoning assisted by GeoVisual map interfaces. For example, a GeoViz scatter plot of the New York City taxi trips visualizes the hot taxi pick-up locations (see FIG. 1A)., A politician may utilize a GeoViz choropleth map to visualize the Twitter sentiment of each presidential candidate in each US county (FIG. 1B). GeoViz involves two main phases:
1) Phase I: Spatial Data Preparation: In this phase, the system first loads the designated spatial data from the database (e.g., Shape files, PostGIS, HDFS). Based on the application, the system may then need to perform a data processing operation (e.g., spatial range query, spatial join) on the loaded spatial data to return the set of spatial objects to be visualized.
2) Phase II: Map Visualization (Map Viz): In this phase, the system applies the map visualization effect, e.g., Heatmap, on the spatial objects produced in Phase I. The system first pixelizes the spatial objects, calculates the intensity of each pixel, and finally renders a geospatial map tile(s).

Existing GeoViz system architectures decouple the data preparation and map visualization phases. For instance, the data scientist may use a large-scale data system for the data preparation phase and a visualization tool, e.g., Tableau, for the map visualization phase. The decoupled approach demands substantial overhead to connect the data management system to the map visualization tool.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIGS. 6A and 6B are simplified illustrations showing a GeoViz workload 1 (Multi-Range+MapViz), according to aspects of the present disclosure;

FIG. 11A is a scatter plot of the performance of a Range+Join+MapViz; and FIG. 11B is a heat map of the performance of the Range+Join+MapViz, according to aspects of the present disclosure;

Corresponding reference characters indicate corresponding elements among the view of the drawings. The headings used in the figures do not limit the scope of the claims.

DETAILED DESCRIPTION

Figure 1B:
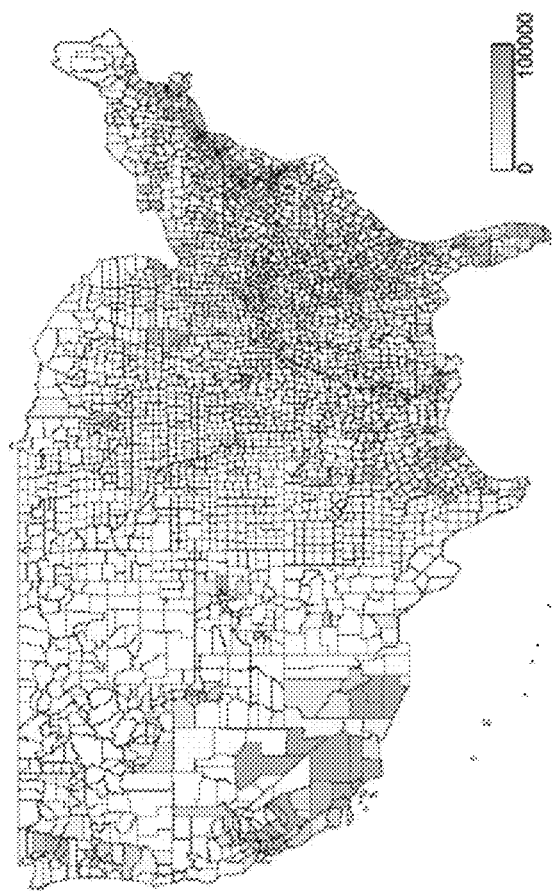
FIG. 1B is an illustration showing an example of geospatial visual analytics for a tweets choropleth map, according to aspects of the present disclosure.

To remedy or otherwise address technical problems associated with existing GeoViz systems, an inventive concept in the form of a hybrid system architecture is described herein. In some embodiments, this system architecture combines the spatial data preparation and map visualization phases in the same distributed cluster to achieve more scalability. However, a hybrid architecture that executes the two GeoViz phases sequentially may lose the opportunity to co-optimize the data preparation and map visualization phases. Hence, such an approach still exhibits limited scalability and less data-to-visualization time when executing a GeoViz task over massive-scale spatial data.

There has been a large body of research on scaling the geospatial map visualization phase using a massively parallelized cluster computing system. However, such systems are only optimized for the map visualization phase and do not necessarily provide support for data management operations. On the other hand, state-of-the-art large-scale spatial data management systems can perform data management operations at scale, but do not provide in-house support for spatial map visualization. Recent research has been proposed for incorporating visualization-awareness in a database system. Such an approach allows users to define visualization workflows using SQL. However, existing Viz-aware data systems either do not provide native support for spatial data or do not address the problem of co-optimizing the data preparation and visualization phases in a distributed and parallel data system.

GeoViz workloads among all nodes in the cluster. To achieve that, the GeoViz system draws a sample of the loaded spatial data and thereby generates non-uniform map tiles accordingly. A main goal is to partition the data once and use such partitioning for both phases of the GeoViz process (i.e., data preparation and map visualization) to reduce the amount of data shuffled across the cluster nodes.

A full-fledged prototype of the GeoViz system can be implemented in Apache Spark. The present disclosure presents extensive experimental evaluation that compares and contrasts the performance of the GeoViz system with state-of-the-art GeoViz architectures over real large-scale spatial data extracted from the NYC taxi trip dataset, and Open Street Maps. The experiments show that the GeoViz system can achieve close to one order of magnitude less data-to-visualization time than its counterparts for a myriad GeoViz workloads over a variety cluster settings.

TABLE I

Compared GeoViz systems

| | Declarative GeoViz | Distributed | Accurate | Spatial Data Preparation | Map Visualization |
|---|---|---|---|---|---|
| Map Visualization Libraries (e.g., ArcGIS, Google Maps) | X | X | ✓ | X | ✓ |
| NanoCube & its varients [10], [15] | X | X | X | X | ✓ |
| Sampling/Aggregation (e.g., ScalaR [3], RS-Tree [22]) | X | X | X | ✓ | needs extension |
| GPU-based Database Systems (e.g., MapD [13]) | X | X | ✓ | ✓ | ✓ |
| Viz-Aware Database Systems (e.g., Ermac [23], CVL [8]) | ✓ | X | ✓ | needs extension | ✓ |
| Declarative Viz Libraries (e.g., Vega-Lite [18], Reactive Vega [19]) | ✓ | X | ✓ | X | ✓ |
| Scalable Map Visualization Systems (e.g., HadoopViz [6]) | X | ✓ | ✓ | X | ✓ |
| Scalable Spatial Data Systems (e.g., GeoSpark [26]) | X | ✓ | ✓ | ✓ | X |
| Babylon | ✓ | ✓ | ✓ | ✓ | ✓ |

The present disclosure provides for a large-scale Geospatial Visual analytics (GeoViz) system that performs the spatial data preparation and map visualization phases in the same cluster. Two benefits come as a byproduct of running the two phases of the GeoViz process in the same cluster. First, it provides the data scientist with a holistic system that allows the system to load, prepare, integrate and perform GeoViz on spatial data. In addition, that plug-and-play approach increases the usability of the system. Secondly, it reduces the overhead of loading the intermediate spatial data generated during the data preparation phase to the designated map visualization tool. Additionally, the GeoViz system has the following main contributions.

The GeoViz system encapsulates the main steps of the geospatial map visualization process, e.g., pixelize spatial objects, aggregate overlapped pixels, render map tiles, into a set of massively parallelized Map visualization operators. Such MapViz operators provide out-of-the-box support for the user to declaratively generate a variety of map visualization effects, e.g., scatter plot, heat map. Most importantly, the GeoViz system co-optimizes the spatial query operators (e.g., spatial join) and MapViz operators (e.g., pixelization) side by side. To achieve that, the GeoViz system takes as input a GeoViz query, written in a SQL-like language, calculates the cost of candidate GeoViz execution plans, and finally comes up with an efficient execution plan.

The GeoViz system also provides a GeoViz-aware spatial partitioning operator that achieves load balancing for

OVERVIEW

Figure 2:
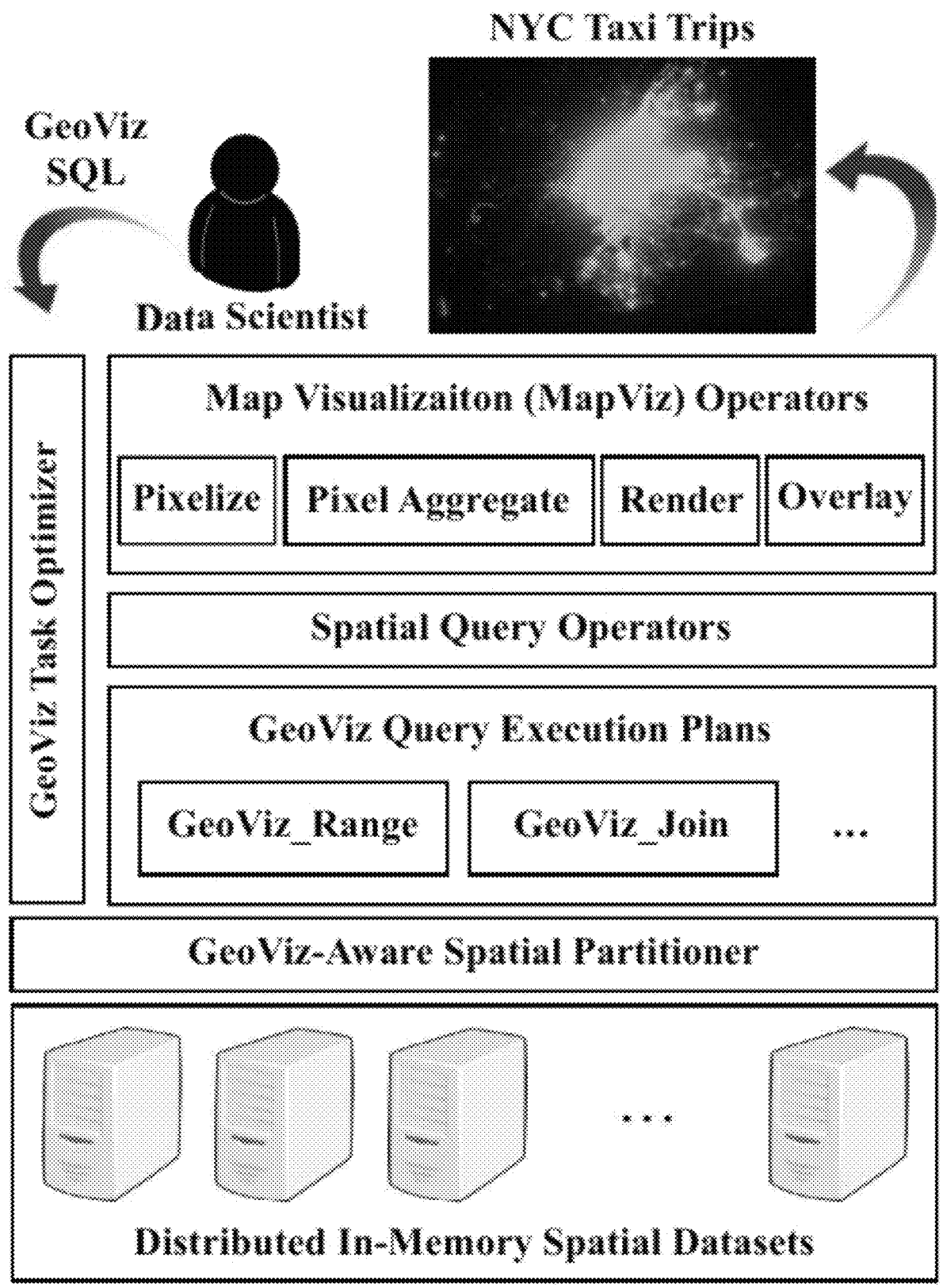
FIG. 2 is an overview of a GeoViz system, according to aspects of the present disclosure.

FIG. 2 gives an overview of the GeoViz system. The GeoViz system assumes that the spatial dataset is partitioned and distributed among the cluster nodes. The user interacts with the GeoViz system using a declarative SQL-like GeoViz language. The GeoViz system processes the GeoViz task and returns the final map tiles to the user. To achieve that, the GeoViz system consists of the following components.

Visualization (MapViz) Operators: The GeoViz system breaks down the map visualization pipeline into a sequence of query operators (namely, Pixelize, Pixel Aggregate, Render, and Overlay). The GeoViz system parallelizes the execution of each operator among the cluster nodes. Furthermore, the GeoViz system seamlessly integrates the map visualization operators with classic database query operators (e.g., range, join) used for the spatial data preparation phase. Furthermore, the GeoViz system exposes the MapViz operators to the user through the declarative GeoViz language. The user can easily declare a new map visualization effect in a SQL statement. For instance, the user can define new coloring rules and pixel aggregation rules.

GeoViz-aware Spatial Partitioner: The GeoViz system employs a partitioner operator that fragments a given pixel dataset across the cluster. Pixels that fall inside a logical space partition go to the same physical data partition and stay at the same machine. Therefore, the GeoViz system can easily render a map image tile using pixels on the same data partition. The partitioner accommodates map visual constraints and also balances the load among the cluster nodes when processing skewed geospatial data. On one hand, it makes sure that each data partition contains roughly the same number of pixels to avoid "stragglers" (i.e., a machine that takes many more inputs than others and hence performs slowly). On the other hand, the logical space partition boundary of each data partition is derived from a map tile space partition of the final image. That way, the GeoViz system can easily stitch the data partitions that belong to the same tile together and render the map tile efficiently.

GeoViz Optimizer: The optimizer takes as input a GeoViz query and figures out an execution plan that co-optimizes the map visualization operators and spatial query operators (i.e., used for data preparation). For instance, if the GeoViz query eventually plots the results of multiple spatial range queries on the same dataset, the optimizer will decide to first map spatial objects to pixels and then execute spatial queries on pixels directly. That way, the GeoViz system avoids redundant pixelization steps. Similarly, since most spatial queries require a load balanced data partitioning scheme to maximize the parallelism level, the optimizer leverages GeoViz-aware data partitioner to partition spatial objects before query operators to avoid unnecessary pixel repartitioning. Moreover, The GeoViz system caches the dataset that is repeatedly accessed by the map visualization and query operators.

Declarative Geoviz

To combine both the map visualization and data preparation phases, The GeoViz system allows users to declaratively define a geospatial visual analytics (GeoViz) task using a SQL-like language. To achieve that, the GeoViz system extends SQL to support GeoViz related commands.

GeoViz Query

The user can issue a GeoViz SQL query using a set of pre-defined GeoViz effects (scatter plot, heat map, choropleth map, . . . ), as follows. The user specifies the input spatial data attribute in the SELECT clause. The FROM clause can directly accept any geospatial dataset that consists of at least one spatial attribute (e.g., point, polygon). The WHERE clause can support classic spatial query predicates (e.g., necessary for the data preparation phase) such as ST_WITHIN or ST_CONTAIN. The subset of the geospatial data that satisfies the query predicate will then be visualized using the GeoViz effect stated in the SELECT clause. Moreover, the user can also pass non-spatial attribute along with spatial objects to the GeoViz function. The semantics are as follows:

```
SELECT      [GeoViz name]([Dataset].[Attribute])
FROM        [Spatial Dataset]
WHERE       [Where clause]
```

Figure 1A:
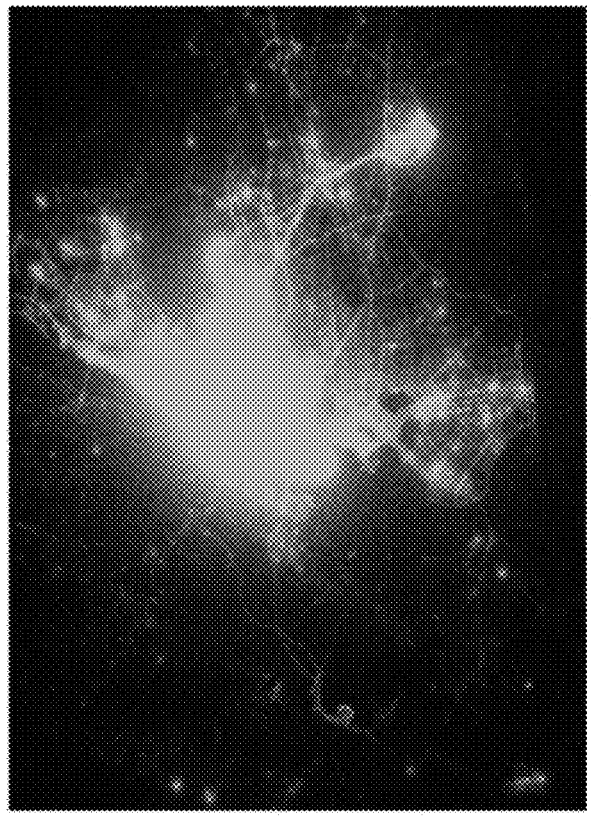
FIG. 1A is a picture showing an example of geospatial visual analytics for a NYC taxi trip scatter plot.

GeoViz Query 1. Given a set of New York City Taxi trips records, the query builds a scatterplot of the pickup points of Taxi trips picked up in the Manhattan area of NYC (similar to FIG. 1A). The example retrieves New York City taxi trip pickup points that are within Manhattan area and passes the data to the GeoViz effect. The corresponding GeoViz SQL statement is given below:

```
SELECT      ScatterPlot_OSM_L6 (taxi.pickup)
FROM        NYCtaxi taxi
WHERE       ST_WITHIN(taxi.pickup, ManhattanBound)
```

GeoViz Query 1 declares a spatial range query on the taxi records to find those trips that lie within Manhattan using the ST_WITHIN (taxi.pickup, Manhattan.bound) function. The query also declares a scatterplot MapViz effect using the ScatterPlot_OSM_L6 ([Input]) function, which returns a map scatter plot of Manhattan Taxi trips (i.e., with Open Street Map zoom level 6 specification.

Define a User-Defined Geoviz Visual Effect

Besides the pre-defined GeoViz effects, the GeoViz system users can define a new map visualization effect from scratch. To achieve that, the GeoViz system employs a new SQL statement that is similar to a User Defined Function, called CREATE GEOVIZ, as follows:

```
CREATE GEOVIZ [Name] ([Input] GEOMETRY)
RETURNS MAP
TILE [Tile quantity]
RESOLUTION [Map resolution]
RULE [Pixel aggregation rule]
COLOR [Color expression]
RETURN MAP
( RENDER PIXEL_AGGREGATE(*)
FROM (PIXELIZE([Input]));)
```

The SQL statement presented above, takes the following parameters: (1) Name is a unique name assigned to the designed GeoViz function. (2) Input is the variable name assigned to the input parameter. All inputs are supposed to be Geometry type, such as Point, Polygon and Line string. (3) Tile quantity is the number of map tiles to be visualized. (4) Map resolution is the whole map image resolution, in the form of Width*Height (unit: pixel). (5) Pixel aggregation rule is the pixel aggregation rule, such as Min, Max, Sum, Average and Uniform. Pixel aggregate operator uses this parameter to decide how to aggregate the overlapped pixels. (6) Color expression is the expression that calculates the color given a pixel's aggregate value.

---
Algorithm 1: Pixelize operator
---

```
Data: <Spatial object> distributed dataset
Result: <Pixel, Aggregate> distributed dataset
1 Function MapPartition(a data partition P)
2  |   Create an empty list L in <Pixel, Initial aggregate>
   |   format;
3  |   foreach <Spatial object> in P do
4  |   |   Do coordinate transformation on all vertexes;
5  |   |   Decompose the object into line segments;
6  |   |   Find all pixels mapped by line segments or points;
7  |   |   Put pixels and their Initial aggregate in L;
8  |   return L;
```

Example. The ScatterPlot_OSM_L6 ([Input]) visualization effect in GeoViz Query 1 generates a scatter plot on NYC taxi trip pickup points passed in the [Input] parameter with OpenStreetMap standard zoom level 6 specification, which requires 4096 map tiles, and 16384*16384 map resolution. The CREATE GEOVIZ statement is given below:

```
CREATE GEOVIZ ScatterPlot_OSM_L6 (input)
RETURNS MAP
TILE 4096
RESOLUTION 16384*16384
RULE UNIFORM
COLOR RGBColor(0,0,255)
RETURN MAP
(RENDER PIXEL_AGGREGATE(*)
FROM (PIXELIZE(input));)
```

The SQL statement (presented above) first describes the map visualization using a set of parameters. "Uniform" rule assigns the same color to all input pickup points. Color expression RGBColor (0,0,255) specifies that the color should be blue.

Map Visualization (Map Viz) Operators

The GeoViz system supports three main MapViz operators: (1) Pixelize, (2) Pixel Aggregate, and (3) Render. Each MapViz operator works as a single step in the map tile image generation pipeline and parallelizes the corresponding logic over the geospatial dataset(s) distributed among the cluster nodes.

Pixelize

The main job of the pixelize operator is to map each spatial object to the corresponding pixels of the map tile(s). Such map tiles will eventually be visualized on the screen. The pixelize operator takes as input a distributed spatial object dataset and the designated image pixel resolution. The operator then scans all geospatial objects in the distributed dataset in a parallelized manner, maps the spatial objects into pixels, and returns the produced distributed pixel dataset to other operators in the GeoViz pipeline. Like a point object, each pixel possesses an integer coordinate on the final image.

As given in Algorithm 1, the operator adopts the following pixelization rule: (1) first decomposes the shape of each spatial object (e.g., line strings, polygons) into line segments (except points); (2) calculates the pixels that are mapped by each line segment or point; and (3) returns the pixels mapped by all segments. All mapped pixels are added into the resulting distributed dataset in the format of <Pixel, Aggregate> pair. The Aggregate indicates the intensity of a pixel, which eventually decides the color of this pixel. Its initial value can be either non-spatial attribute of its parent object (i.e., temperature) or just 1. Pixel aggregate operator, the next operator, will aggregate them. Pixels that are not mapped to any spatial object will not appear in the resulting <Pixel, Aggregate> dataset. Other map visualization operators manipulate these pixels and eventually plot them on a map tile. The pixelize operator accepts various spatial data sources such as persistent storage (e.g., AWS S3, HDFS, PostGIS) or intermediate spatial datasets generated by query operators.

---
Algorithm 2: Pixel aggregate operator
---
```
  Data: GeoViz-partitioned <Pixel, Aggregate> dataset
  Result: <Pixel, Aggregate> distributed dataset
1 Function MapPartition(a data partition P)
2 |   Create an empty <Pixel, Aggregate> HashMap H M;
3 |   foreach <Pixel, Aggregate> Px in P do
4 |   |   if Px exists in H M then
5 |   |   |   Update Px's aggregate by enforcing an
```

---
Algorithm 2: Pixel aggregate operator
---
```
  |   |   |   aggregation rule;
6 |   |   else
7 |   |   |   Put Px and its aggregate into H M;
8 |   return H M;
```

Cost. Given $N_{objects}$ input spatial object and P data partitions, the cost of the pixelize operator $C_{Pixelize}$=objects per partitions, which is equivalent to $$\frac{N_{objects}}{P}$$

Pixel Aggregate

After pixelizing geospatial objects, the pixel aggregate operator calculates a user-defined aggregate for each pixel. The aggregate operator determines the intensity of each pixel in the map tile image. The pixel aggregate operator takes as input the distributed <Pixel, Aggregate> dataset and aggregates the Aggregate value of all overlapped pixels, i.e., pixels that have the same pixel coordinates. The pixel aggregate operator scans pixels that share the same pixel coordinate in parallel and aggregates the aggregate values of overlapped pixels. Assume the GeoViz query is to visualize the spatial distribution of the dataset such as a Heat map of geo-tagged tweets. The pixel aggregate operator then counts the number of overlapped pixels for each pixel coordinate and aggregates the value based on the pre-defined aggregation rule. In case the GeoViz task aims at visualizing a non-spatial attribute (i.e., temperature) of the spatial objects, the GeoViz system performs the aggregation function to such an attribute. For example, for a heat map of land surface temperatures, the operator aggregates the temperature (i.e., take the average) attribute at each pixel coordinate.

As shown in Algorithm 2, the pixel aggregate operator performs a local scan on each spatial data partition. The operator stores all pixels in a hash map and updates the aggregate value if overlapped pixels appear when inserting pixels into the hash map. The GeoViz system offers different aggregation rules, including Min, Max, Sum, Average and Uniform, when updating overlapped pixels' aggregate value.

Cost. Given $N_{pixels}$ input pixels and P data partitions, the cost of the pixel aggregate operator $N_{Pixel\ aggregate}$ is equal to the number of pixels per partition $$\left(\frac{N_{pixels+}}{P}\right)$$

Render

After calculating the aggregate of each pixel, the render operator decides a proper color for each pixel according to the aggregate value. Colors become visible to the user when rendering the map tile image. The render operator takes as input the <Pixel, Aggregate> dataset and generates a distributed image tile dataset in the format of <TileID, MapTile>. The aggregate value is pre-normalized to domain [0,255]. The GeoViz system accepts a user-defined function, or otherwise uses a default equation to decide the pixel color, which are mapped to the pixel aggregate values. The GeoViz system also plugs the color equation into a Map function and executes it in parallel among all participating data partitions. After performing the render operator, the aggregate in <Pixel, Aggregate> dataset becomes a RGB color value. The newly generated image of each data partition has a TileID. Note that some images generated using different data partitions may have the same TileID since the data in these partitions represents a portion of the same map image tile. The map tile browser can handle this easily. Eventually, all image tiles are rendered in parallel and the system can then return the generated <TileID, MapTile> to the user.

The render operator also offers an image processing filter function which applies classic photo filters such as sharp, blur or diffusion to the map tile image in order to deliver some special effects. Its basic idea is, for a pixel in the image, add the aggregate values from its neighbor pixels, weighted by a convolution matrix, to this pixel. Each convolution matrix describes a 3*3 matrix in which each individual element (weight) indicates how strong the center pixel's color is affected by the corresponding neighbor pixel's color. The new aggregate of a $$\sum \frac{\text{Neighbors}}{i = a \text{ pixel}} i\text{'s weight} * i\text{'s Aggregate}.$$

Cost. Given $N_{pixles}$ pixels and P data partitions, the cost of the render operator is equal to $$\frac{N_{pixels}}{P}.$$

Geoviz-Aware Spatial Partitioner

Figure 3B:
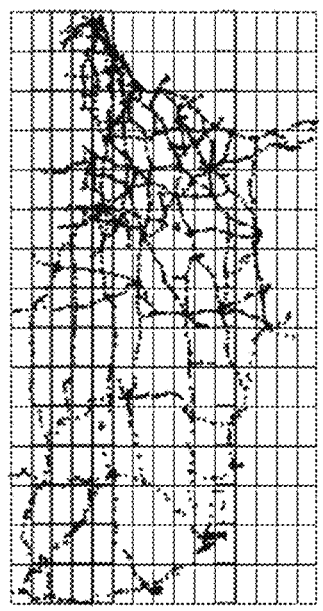
FIGS. 3A-3C are illustrations showing various spatial partitioning approaches, according to aspects of the present disclosure.
Figure 3C:
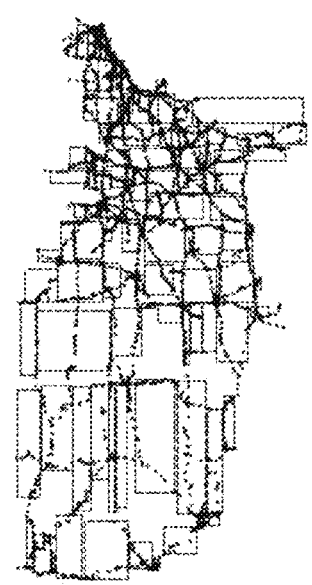

Existing spatial partitioning approaches, such as R-Tree and Quad-Tree, exhibit good performance when executing spatial queries for the data preparation phase. However, these approaches do not consider the fact that the final output of the GeoViz task will be eventually presented on a set of uniform map tile images (FIG. 3C). In other words, existing spatial partitioning techniques ignore the map tile boundaries and hence are not able to optimize the visualization operators that process pixels and produce map tiles. On the other hand, partitioning the workload based on the uniform map tiles demands less partitioning overhead. That also avoids the tedious process of recovering the map tiles to be visualized using existing map visualization tools. However, the tile-based partitioning approach cannot handle the spatial data skewness and hence fails at balancing the workload among the cluster nodes (FIG. 3B).

The GeoViz-aware spatial partitioner proposed by Baby-Lon takes as input a set of geospatial objects or pixels and finally returns the geometrical boundaries of determined data partitions. Since it takes into account the load balance and the visualization constraint, this partitioner partitions data once for both the data preparation and map visualization phases to reduce the amount of data shuffling in the cluster. Each input spatial object (or pixels) possesses a tile ID that indicates the uniform map tile where this object lies in. While enforcing the spatial proximity constraint, spatial objects assigned to the same partition should also belong to the same map tile image. In other words, all geospatial objects in a data partition should have the same map tile ID. To determine the partitions, the partitioner employs a three-step algorithm:

Step I: Spatial Data Sampling: This step draws a random sample from the input spatial dataset and uses it as a representative set in order to diminish the data scale. Geometrical boundaries of every finalized data partition will be applied again to the entire dataset and make sure all objects are assigned to partitions.

Figure 3A:
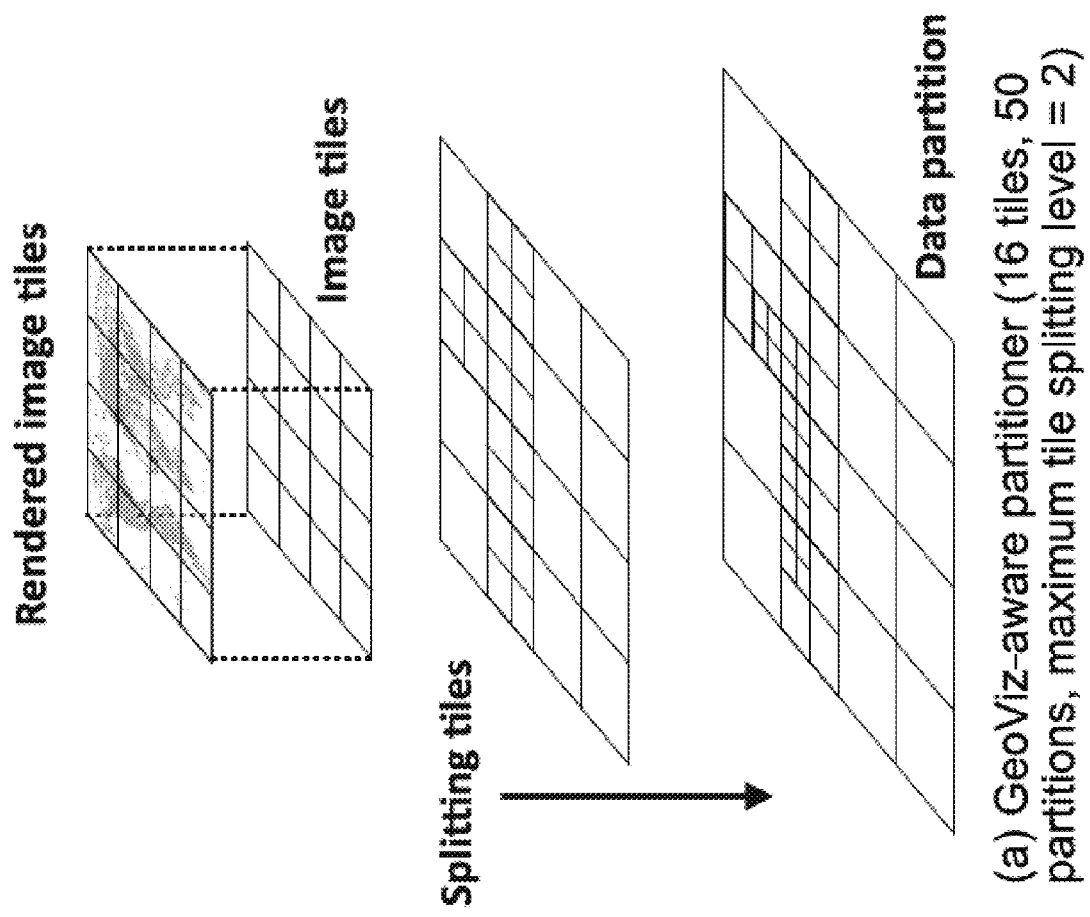

Step II: Tile-aware Data Partitioning: As shown in FIGS. 3A-3C, this step first splits the space into uniform map tiles, which represent the initial geometrical boundaries for data partitions. Starting from the initial tiles, the partitioner repartitions each tile in a Top-down fashion. Similar to a Quad-Tree, the partitioning algorithm recursively splits a full tile quadrant space into four sub-tiles if a tile still contains too many objects. As the splitting goes on, tile boundaries become more and more non-uniform, but load balanced. When the splitting totally stops (reach the maximum tile splitting level L, given by the user), the leaf level sub-tiles become the geometrical boundaries for the physical data partitions (see the last level in FIG. 3A).

Step III: Physical Partitioning: This step passes the partition structure (FIG. 3A-3C) stored in the master machine to all machines in the cluster. For every spatial object or pixel, GeoViz partitioner first decides the uniform map tile that it belongs to. Then, this step searches the corresponding Quad-tree in a top-down fashion and stops at a sub-tile boundary that fully covers the spatial object. If the search algorithm stops at a leaf-level sub-tile, the object is assigned to the corresponding partition. If the search stops at a non-leaf sub-tile (i.e., given a large polygon as input), the object is assigned to all leaf-level sub-tiles under this non-leaf sub-tile. Eventually, objects or pixels that fall in the same leaf-level sub-tiles are physically located in the same cluster node.

Note that the three steps run sequentially and each step runs on a distributed spatial dataset (i.e., geospatial objects or pixels) in parallel. Therefore, the overall cost for GeoViz-aware spatial partitioner is:

$$C_{Partitioner} = C_{Sampling} + C_{CalcPartition} + C_{RepartitionAll}$$

Consider a set of geospatial objects or pixels with $N_{objects}/N_{pixles}$ elements in total and P data partitions, sampling ratio s, the cost of the parallel spatial sampling step $C_{Sampling}$, which performs a local scan per partition, is $$\frac{N}{P}.$$

The cost $C_{CalcPartition}$ of deciding the tile-aware spatial partitions on the master machine is equivalent to scanning the sample once is s*N. For a geospatial object or pixel in a partition, Step III searches the corresponding Quad-tree to locate the relevant data partition. Assuming that every map tile is splitted until the max tile splitting level L and there are $4^L$ sub-tiles under each tile, the search cost is:
$$C_{LocatePart} = \log_4(4^L) = L$$
Given that each partition contains $$\frac{N}{P}$$

objects/pixels, the cost of assigning partition ID and shuffling all records across the cluster is as follows (N can be either $N_{objects}$ or $N_{pixels}$):

$$C_{RepartitionerAll} = \frac{N}{P} * C_{LocatePart} + C_{Shuffle} = \frac{N}{P} * L + N$$

Integrate MapViz With Query Operators

In this section, the process in which the GeoViz system combines MapViz operators with existing spatial query operators to assemble an execution plan will be discussed. Since MapViz operators are logical steps in generating the map tile(s) image, it is recommended that they be executed in a sequential order: Pixel→Pixel aggregate→Render. Since the render operator handles only map tiles, it has to be placed at the top of the entire GeoViz execution plan. However, the main benefit of splitting the MapViz functionality into three operators is to make the integration of the MapViz with existing query operators more efficient.

Combine MapViz with Spatial Range Query

The system user may need to filter the spatial dataset in the preparation phase before applying the MapViz effect. That can be achieved through the well-known spatial range query, which returns a subset of the input spatial objects or pixels that lie within a given query window. An example of a query that combines MapViz with a spatial range query operator is GeoViz Query 1.

Figures 4A, 4B:
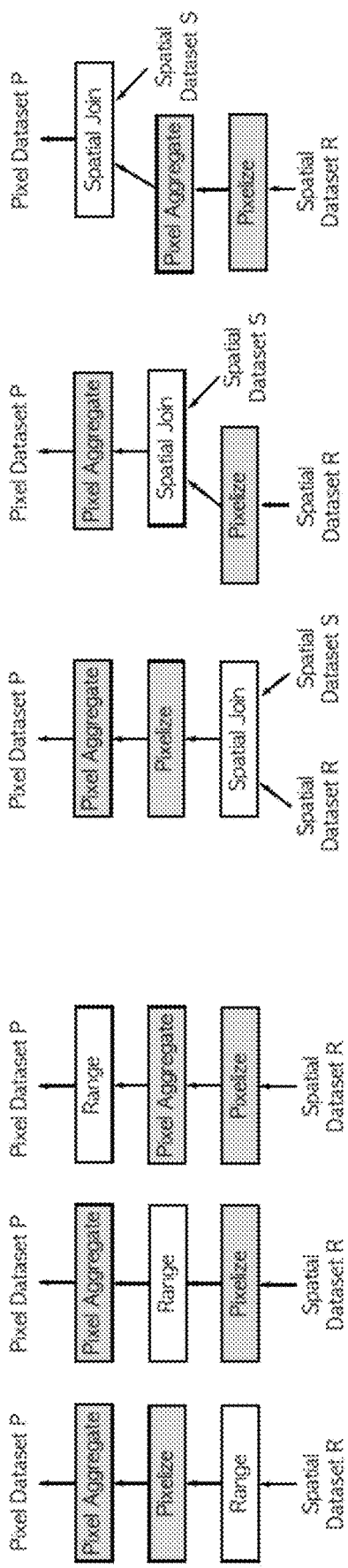
FIGS. 4A and 4B are simplified block diagrams that combine MapViz Operators with Spatial Query Operators, according to aspects of the present disclosure.

Given a GeoViz query, the GeoViz system can interleave the execution of the range query operator as well as the pixelize and pixel aggregate MapViz operators resulting in different GeoViz query execution plans (see FIG. 4A). The variety of query execution plans allows the GeoViz system to co-optimize both phases of the GeoViz query.

For seamless integration, the GeoViz system extends classic spatial query operators to construct spatial predicates, not only on spatial objects, but also on pixels. Given a pixel dataset and a spatial query window, the GeoViz system first transforms the geospatial coordinates of the query window to pixel coordinates then checks it against pixels. Given $N_{objects}$ input spatial objects or $N_{pixels}$ pixels, it can be easily concluded the time cost is equal to the time of scanning P data partitions in parallel $$\left( C_{range} = \frac{N}{P} \right),$$

N can be either $N_{objects}$ or $N_{pixels}$.

Integrating MapViz with Spatial Join

The data scientist may need to integrate multiple datasets in the spatial preparation phase of the GeoViz task. To achieve that, a spatial join operator takes as input two spatial datasets R and S as well as a spatial join predicate and returns every pair or objects in R and S that satisfy the spatial predicate. An example of a GeoViz query that combines spatial join and MapViz is given below GeoViz Query 2. Given a set of NYC taxi trips and a set of area landmarks, the query finds all Taxi trips with pickup location lying within the area landmarks such as airports, cemeteries, parks, schools, and visualizes the join result using a heat map visualization effect. The corresponding GeoViz SQL statement is as follows:
SELECT HeatMap_OSM_L6 (taxi.pickup)
FROM NYCtaxi taxi, AreaLandmarks arealm
WHERE ST_WITHIN(taxi.pickup, arealm.boundary)

Figure 5:
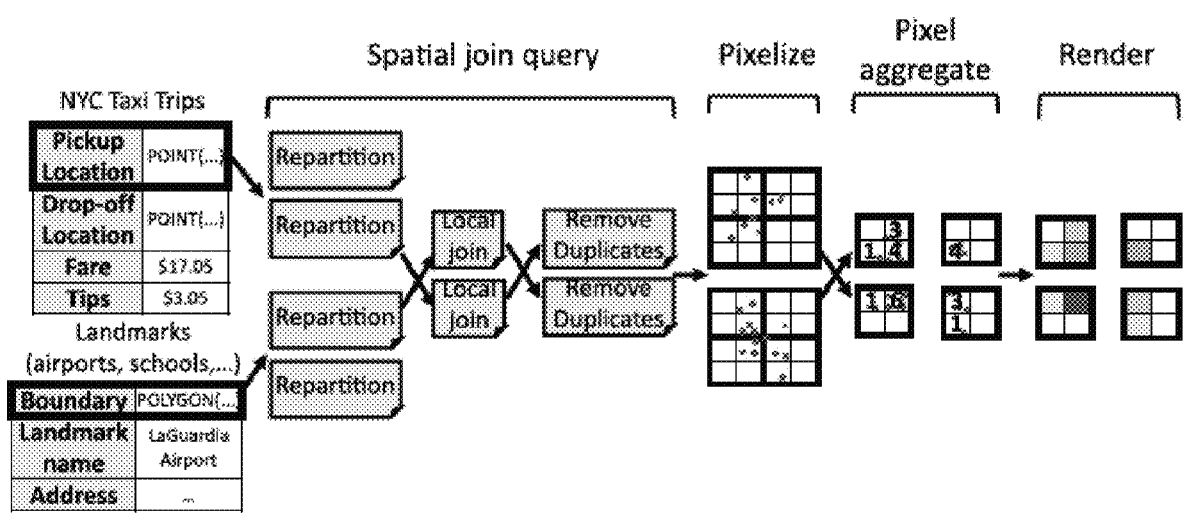
FIG. 5 is a simplified illustration showing data flow of a straightforward GeoViz plan, according to aspects of the present disclosure.

The GeoViz system can interleave the execution of the spatial join operator as well as the pixelize and pixel aggregate MapViz operators resulting in different GeoViz query execution plans (FIG. 4B). The flexible integration of MapViz operators with the spatial join operator gives the GeoViz system the opportunity to optimize the GeoViz workflow execution (FIG. 5).

For seamless integration, the GeoViz system slightly extends the spatial join operator to join objects/pixels by performing a coordinate transformation step to the join predicate. Furthermore, the GeoViz system skips (if necessary) the duplicates removal step, performed in classic parallel spatial join algorithms, because removing duplicates makes no visual difference on the finally generated map visualization. Given $N_{objects}$ input spatial objects or $N_{pixels}$ input pixels plus $N_{window}$ without considering indexes, the cost of a spatial join query operator is equivalent to a local nested loop join on P data partitions in parallel. Thus, its cost is $$\left( \frac{N * N_{window}}{P^2} \right),$$

N can be either $N_{objects}$ or $N_{pixels}$.

Geoviz Optimizer

A GeoViz query execution plan involves several operators: (1) Map visualization (MapViz) operators: that perform pixelization, pixel aggregation and map tile rendering; (2) GeoViz-aware spatial partitioner: that repartitions geospatial data and pixels across the cluster nodes based upon spatial proximity and visualization constraints; and (3) Spatial query operators: that process spatial queries on the input dataset. The optimizer takes as input a GeoViz query, written in SQL, parses it, and calculates the cost of candidate GeoViz execution plans. The optimizer finally comes up with an efficient execution plan.

The straightforward GeoViz execution plan performs the two GeoViz phases (i.e., data preparation and map visualization) separately in a serial fashion. Alternatively, the optimizer enumerates a set of candidate plans based upon pre-defined heuristic optimization strategies (as shall be discussed below). The optimizer then calculates the time cost of each candidate GeoViz execution plan using the cost models described herein, and finally selects the plan with the minimum execution time cost. The efficient plan interleaves the execution of the map visualization and query operators to minimize the total run time of the GeoViz task.

Estimate the Intermediate Data Size

An important aspect that the GeoViz system takes into account is the intermediate data size produced by each operator. Reducing the intermediate data size leads to less data passed between different GeoViz operators and hence reduces the amount of data shuffle across the network. Note that estimating the intermediate data size is difficult since operators in the GeoViz pipeline do not only deal with pure spatial objects, but also manipulate pixels and map tiles.

Pixelize operator: Suppose the GeoViz task is to visualize a set of $N_{objects}$ uniformly distributed rectangular spatial objects. The number of pixels $N_{pixels}$ produced by the pixelize operator may not be the same as the number of input spatial objects $N_{objects}$. When the map resolution R is lower than $N_{objects}$, each rectangle object will be pixelized to a single pixel and the human eye cannot identify the shape using the low-resolution map. On the other hand, in case the resolution is high, a rectangle object may be assigned to multiple pixels and the human eye can hence identify detailed shapes on the final map. The estimated intermediate data is:

$$Size_{pixelize} \begin{cases} \text{Input} < \text{Output} & N_{objects} < R \\ \text{Input} = \text{Output} & N_{objects} >= R \end{cases}$$

However, if the underlying spatial dataset represents a set of points, the data scale will not change under any resolution because one point object has to be assigned to a single pixel regardless of the resolution.

Pixel aggregate operator Pixel aggregate operator significantly shrinks the intermediate data size when the designated map resolution is low. That is due to the fact that many overlapped pixels are aggregated into a single pixel and the size of the output pixels is never more than the resolution R. In case the resolution is much higher than the produced pixels from Pixelize operator, the pixel aggregate operator may not reduce the size of the intermediate results. Therefore, it can be concluded that:

$$Size_{aggregate} \begin{cases} \text{Input} > \text{Output} & N_{pixels} > R \\ \text{Input} = \text{Output} & N_{pixels} < -R \end{cases}$$

Spatial query operators: The spatial range query operator filters the input data size using a range query window so that it also reduces the intermediate data size. Spatial join operator may prune less intermediate data since it consists of many range windows. The GeoViz system estimates the intermediate data size using the classic spatial query selectivity factor estimation. Thus, suppose $N_{window}$ query windows have the same area $Area_{window}$, query operators' impact on the intermediate data size can be estimated by adding up the selectivity of each query window:

$$Size_{query} = \text{Query selectivity} * N = \frac{Area_{window}}{\text{Dataset area}} * N_{window} * N,$$

N can be either $N_{objects}$ or $N_{pixels}$.

Heuristic Optimization Strategies

The GeoViz system's GeoViz optimizer reduces the search space by directly applying the following heuristic optimization strategies to the candidate execution plans:

Merge operators: If a baseline execution plan contains an operator that appears several times and acts on the same spatial dataset, the optimizer merges the repeated operators to a single operator to avoid redundant computation.

Cache frequently accessed Pixels: The optimizer considers to use memory caching. If the dataset is accessed multiple times, the optimizer will cache it to avoid redundant data loading/processing time. For instance, the straightforward execution plan that runs the data preparation and visualization in series is given in FIG. 6A. Instead, the optimizer will consider the plan that caches the pixel dataset to speed up the queries over multiple Range+MapViz predicates (FIG. 6B).

Push operators Up/Down: Some operators may increase or reduce the intermediate data size (as explained before). For the operators that can reduce intermediate data size (e.g., Pixel aggregate, Range query and Join), the GeoViz optimizer produces the candidate plan that executes them as early as possible. On the other hand, the GeoViz optimizer disregards plans which execute operators that increase the intermediate data size.

After applying the heuristic strategies, the GeoViz system optimizer produces candidate execution plans. The optimizer then calculates the time cost of each candidate GeoViz execution plan using the cost models, and finally applies a dynamic programming framework (similar to the classic database query optimizer) to find the plan with the minimum execution time.

Case Study: Range+Spatial Join+Map Viz

Assume that the data scientist wants to visualize a heat map of Manhattan taxi trips that were picked up in Manhattan landmark areas, e.g., parks and schools.

Figures 7A, 7B:
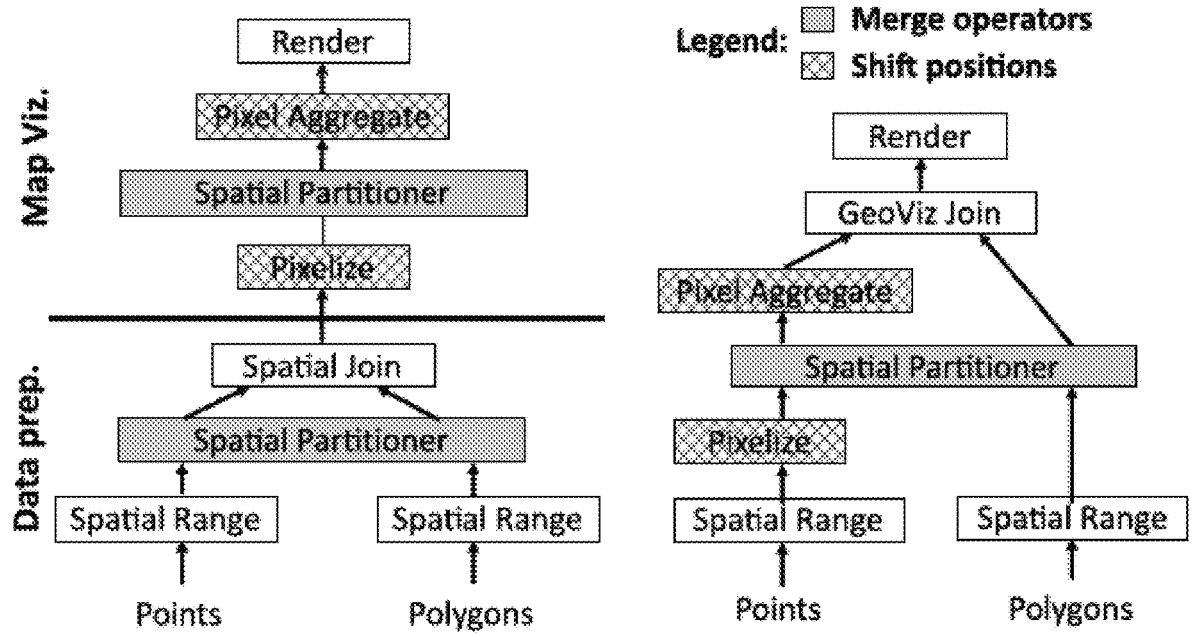
FIGS. 7A and 7B are simplified illustrations showing a GeoViz workload 2 (Range+Join+MapViz), according to aspects of the present disclosure.

GeoViz Query 3. Given a set of NYC taxi trip pickup points and a set of area landmarks, the query finds all Taxi trips with pickup location lying within Manhattan and the area landmarks that also lie within Manhattan. The query applies spatial join between Manhattan Taxi trips and the Manhattan landmarks a finally visualizes the join result using a heat map visualization effect. The corresponding SQL is as follows:
SELECT HeatMap_OSM_L6 (taxi.pickup)
FROM NYCtaxi taxi, AreaLandmarks A
WHERE ST_WITHIN(taxi.pickup, ManhattanBound),
 ST_WITHIN(A.boundary, ManhattanBound),
 ST_WITHIN(taxipickup, A.boundary);

The non-optimized execution plan (FIG. 7) first performs range queries on New York City taxi trip pickup points and US landmark area boundaries using Manhattan region as the query window, respectively. Then, it joins the results of the two range queries and passes the join result to the map visualization operators, which in turn generate the map image. However, as shown in FIGS. 5 and 7, the straightforward plan exhibits three time-consuming data shuffling operations, two introduced by spatial data partitioners and one introduced by the duplicates removal step. On the other hand, the optimized plan picked by the GeoViz system first applies the spatial range predicate on the two datasets to reduce the data scale. Then, it performs the pixelize operator on the point object dataset (NYC Manhattan taxi trips), then runs the pixel aggregate operator on the overlapped pixels to reduce the intermediate data size. Instead of directly pixelizing the polygon dataset (landmark area boundaries), which leads to large-scale intermediate data, the optimizer joins the city boundaries with pixels. Moreover, since both the spatial join operator and the pixel aggregate operator run on the same partitioned data, the two spatial partitioning operators are merged and placed at the beginning of the plan (i.e., pushed down). In addition, the duplicate removal step is skipped by the optimizer to reduce the number of data shuffling operations.

EXPERIMENTS

Figure 8C:
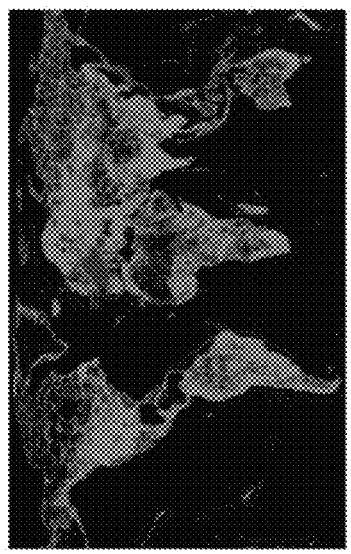
FIGS. 8A-8C are map visualization examples, according to aspects of the present disclosure.
Figure 8B:
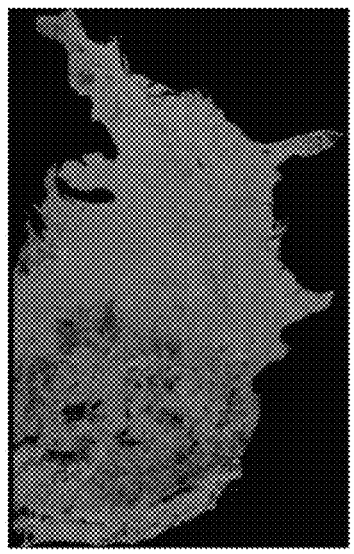
Figure 8A:
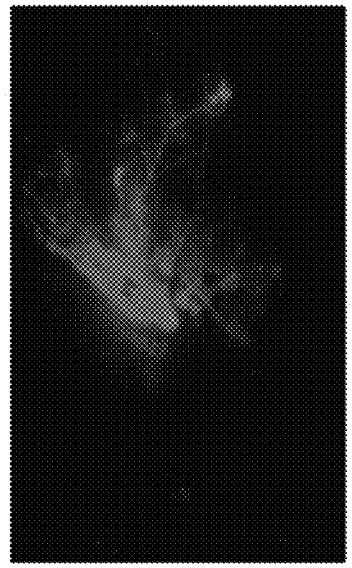

In this section, a comprehensive experimental evaluation of the GeoViz system will be discussed. Six real spatial datasets in the experiments were used (see Table II and FIG. 8): (1) TIGER Area Landmarks: 130,000 polygonal boundaries of all area landmarks (i.e., hospitals, airports) collected by U.S. Census Bureau TIGER project. (2) OpenStreetMap Postal Area Dataset: 170,000 polygonal boundaries of postal areas (major cities) on the planet. Each polygon in this dataset is represented by 10 or more vertexes. (3) TIGER Roads: includes the shapes of 20 million roads in US. Each road is represented in the format of a line string which is internally composed by many connected line segments. (4) TIGER Edges: contains the shapes of 73 million edges (i.e., roads, rivers, rails) in US. Each edge shape is represented by a line string which has connected line segments. (5) New York Taxi [25]: contains 1.3 billion New York City taxi trip records from January 2009 through December 2016. Each record includes pick-up and drop-off dates/times, pick-up and drop-off location coordinates, trip distances, itemized fares, and payment method. But the pickup point coordinates are primarily used in the experiments. (6) OpenStreetMap Point: contains 1.7 billion spatial points on the planet, e.g., boundary vertices of attractions and road traces.

Cluster settings. The experiments were conducted on a cluster which has one master node and two worker nodes. Each machine has an Intel Xeon E5-2687WV4 CPU (12 cores, 3.0 GHz per core), 100 GB memory, and 4 TB HDD. Apache Hadoop 2.6, Apache Spark 2.11, SpatialHadoop 2.4 (+visualization extension called HadoopViz), GeoSpark 0.9 (+visualization extension), and The GeoViz system are installed in this cluster.

TABLE II

Test datasets

| Dataset | Records | Description |
| --- | --- | --- |
| TIGER Area Landmarks | 130 thousand | Polygonal Boundaries of area landmarks in U.S. |
| OSM Postal Codes | 171 thousand | Polygonal Boundaries of postal areas (major cities) in the world |
| TIGER Roads | 20 million | Line string shapes of all roads in road |
| TIGER Edges | 73 million | Line string of all rivers, roads, rails in U.S. |
| NYC taxi | 1.3 billion | New York City taxi trip pickup points |
| QSM Point | 1.7 billion | All points in the world |

Compared approaches. In order to carefully investigate the visual analytics performance, were compared the following approaches on generating scatter plot and heat map: (1) The GeoViz system: This approach is the full GeoViz system of the present disclosure, which fully employs spatial query operators, MapViz operators, GeoViz-aware Partitioner, and optimizer. Given a test scenario, the GeoViz system optimizes the execution plan as far as possible. (2) SparkViz: this approach is GeoSpark and its visualization extension. SparkViz leverages Apache Spark to transfer intermediate data via memory but runs a GeoViz in two separate phases (data preparation SparkViz-Prep and map visualization SparkViz-Viz) without any optimization. SparkViz uses regular spatial partitioning method in data preparation and map tile partitioning in map visualization. (3) HadoopViz: this approach is SpatialHadoop and its visualization extension, namely HadoopViz. HadoopViz also runs a GeoViz in two separate phases (data preparation HadoopViz-Prep and map visualization HadoopViz-Viz) without any optimization. Intermediate data in this approach is transferred through disk.

GeoViz Query Workload. To analyze the performance of the GeoViz system experiments were performed on two main GeoViz query workloads. The MultiRange+MapViz workload is similar to GeoViz Query 1, which issues a spatial range query and visualize its result to either scatter plot or heat map. The query is performed five times in this workload (see below) using five different spatial range predicates. The GeoViz system picks the optimized plan depicted in FIG. 6 and the other approaches use the straightforward plan. The following range query predicates were used: (1) Arizona state boundary for Roads (2) Arizona state boundary for Roads Edges (3) Manhattan island boundary for NYCtaxi (4) US mainland boundary and OSMpoint. The Range+Join+MapViz workload is similar to GeoViz Query 3. The GeoViz system executes the optimized plan depicted in FIG. 7B and the other approaches use the straightforward plan depicted in FIG. 7A. For this workload, the following range and join predicates are used: (1) AreaLandmarks in Arizona joined with Roads in Arizona, (2) AreaLandmarks in Arizona joined with Edges in Arizona (3) AreaLandmarks in Manhattan joined with NYCtaxi in Manhattan, and (4) OSMPostal in US mainland joins OSMpoint in US.

Default parameter settings. By default, Open-StreetMap standard zoom level 6 was used as the default map visualization setting for all compared approaches: it requires 4096 map tiles (256*256 pixels per tile), 268 million pixels in total.

The maximum tile splitting level in the GeoViz-aware spatial partitioner is 3, which means each map tile is split at most 3 times. Unless mentioned otherwise, SparkViz uses Quad-Tree partitioning in data preparation phase and map tile partitioning for the map visualization phase. HadoopViz uses R-Tree data partitioning in the data preparation phase and map tile partitioning in the map visualization phase. All compared approaches use the 64 MB as initial data partition size.

Impact of Spatial Partitioning

In this section, four different spatial data partitioning approaches are compared—GeoViz-aware partitioning, map tile partitioning, Quad-Tree spatial partitioning and R-Tree partitioning. All these partitioning methods are implemented in the GeoViz system. The GeoViz workload used in this section contains only map visualization, which directly performs the visualization effect on the entire spatial datasets and produce scatter plots or heat maps. For The GeoViz system partitioner, the maximum tile splitting level parameter was varied (i.e., Level 1, 2, and 3).

Figure 9A:
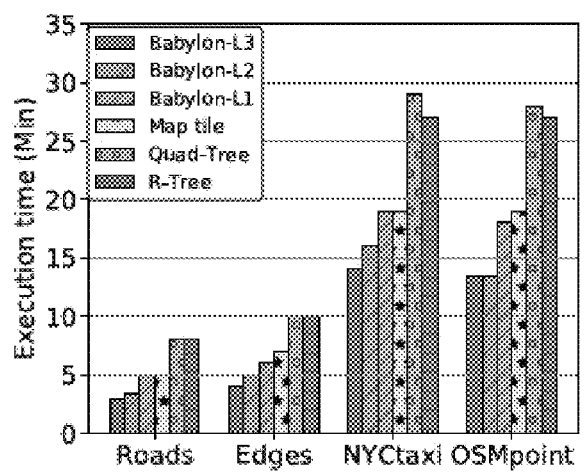
FIG. 9A is a scatter plot of the performance for a GeoViz partitioner.
Figure 9B:
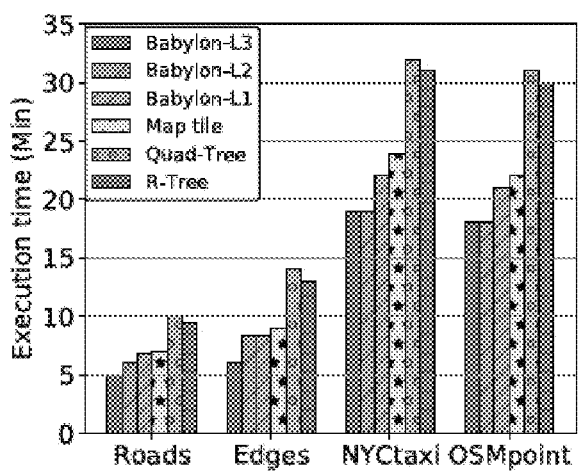
FIG. 9B is a heat map of the performance for the GeoViz partitioner, according to aspects of the present disclosure.

As shown in FIG. 9, GeoViz optimizer runs 1.5×-2× faster than uniform map tile partitioning method as expected. This is because the map tile partitioning approach does not balance the load among the cluster nodes. That degrades the performance even more when the spatial dataset is very skewed. Moreover, a visualization task with larger The GeoViz system max tile splitting level run 15% faster than its variant with the lower splitting level. That happens since the GeoViz-aware partitioner can produce more balanced data partitions when it keeps splitting tiles (until reaching the minimum data partition boundary). Furthermore, the Quad-Tree and R-Tree partitioning approaches are 50%-70% slower than other partitioning methods because such partitioning methods do not consider the map tile sizes and hence the GeoViz system has to add an extra step to recover the map tiles before rendering. The map tile recovery step assigns each pixel a TileID and groups pixels by their TileID. This step leads to an additional data shuffling operations to group pixels.

Performance of MultiRange+MapViz

In this section, the performance of the Multi-Range+MapViz GeoViz query workload was studied. A query was run on the GeoViz system SparkViz, and HadoopViz GeoViz approaches. The experiment also involves four datasets with different scale.

Figure 10A:
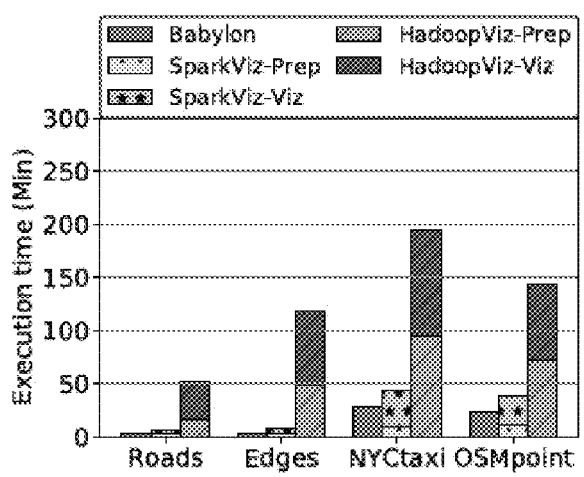
FIG. 10A is a scatter plot of the performance of a MultiRange+MapViz.
Figure 10B:
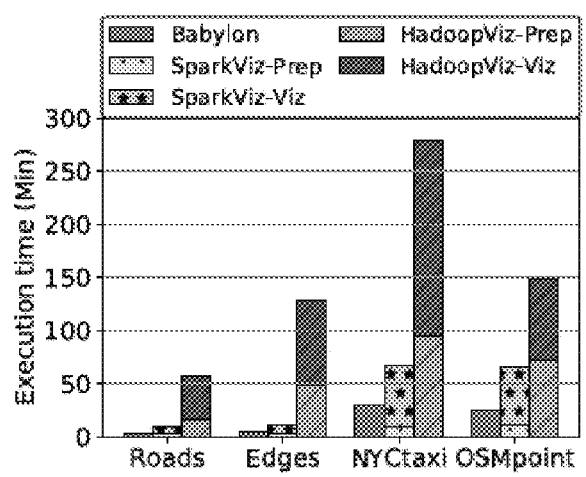
FIG. 10B is a heat map of the performance of the MultiRange+MapViz, according to aspects of the present disclosure.

As shown in FIGS. 10A and 10B, the GeoViz system is 50% faster than SparkViz and up to an order of magnitude faster than HadoopViz for generating scatter plot visualization. The results makes sense because: (1) The GeoViz system's execution plan (FIGS. 6A and 6B) first pixelizes spatial objects to pixels and caches them into memory, and all spatial range predicates run directly on the cached pixel dataset. Although the first GeoViz Query 1 request in this workload takes more time, the average amortized time is way less. (2) The GeoViz partitioner is more load-balanced than the map tile partitioning adopted by SparkViz and HadoopViz. The map tile partitioning just repartitions the space to uniform grids and does not take into account data skewness. (3) In contrast to Spark-based systems, HadoopViz reads/writes intermediate data on disk. On small datasets like Roads and Edges, the GeoViz system is around 8 times faster than HadoopViz because, The GeoViz system can process all intermediate data in memory.

When generating the heat map visualization effect for the MultiRange+MapViz workload, the GeoViz system is around two times faster than SparkViz. Generating the heat map visualization effect takes 20%-50% more time than generating a scatter plot because generating heat map effect applies an image processing filter to colors in the Render operator and this leads to more local iterations on each data partition.

To summarize, the results show that the two optimization strategies employed by The GeoViz system's optimizer, merge operators together and cache frequently accessed pixels, indeed produces a more efficient query plan.

Performance of Range+Join+MapViz

As it turns out from the figure, the GeoViz system is two times faster than SparkViz and an order of magnitude faster than HadoopViz on all data scales. On large-scale datasets such as NYCtaxi and OSMpoint, the total execution time of BABYLON is even less than the data preparation time of its counterparts (SparkViz-Prep and HadoopViz-Viz) in both FIGS. 11A and 11B. That happens because (1) The execution plan picked by the GeoViz optimizer (FIGS. 7A and 7B) only leads a single data shuffling operation, which happens at the very beginning. Meanwhile, SparkViz and HadoopViz perform two extra data shuffling operations, which take its toll on the overall data-to-visualization time. Based on the experiments, for the case of OSMpoint data, shuffling intermediate data across cluster in the GeoViz system only sends around 1 GBytes of data across network. On the other hand, SparkViz transfers more than 5 GBytes of data during the shuffling phase. (2) The GeoViz system aggregates the pixels before performing the spatial join operator, and hence reduces the amount of intermediate data passed to the spatial join operator, which improves the performance w.r.t time. Moreover, BABYLON is around 6 times faster than HadoopViz. That happens due to the fact that HadoopViz performs two extra data shuffling steps and the shuffled data is written/read to HDFS.

Impact of Range Query Area

This section studies the impact of different query area. NYCtaxi dataset and MultiRange+MapViz GeoViz workload were used but vary the range query window area. The smallest query window area is a 320 km$^2$ rectangle region in the center of New York City region. The GeoViz system keeps multiplying this area by four and generates another three query windows, 4*320 km$^2$, 16*320 km$^2$, and 64*320 km$^2$. Each test workload takes as input a range query window and GeoViz Query 1 in this workload repeats five times using this query window. The GeoViz system was compared with SparkViz and HadoopViz.

Figure 12A:
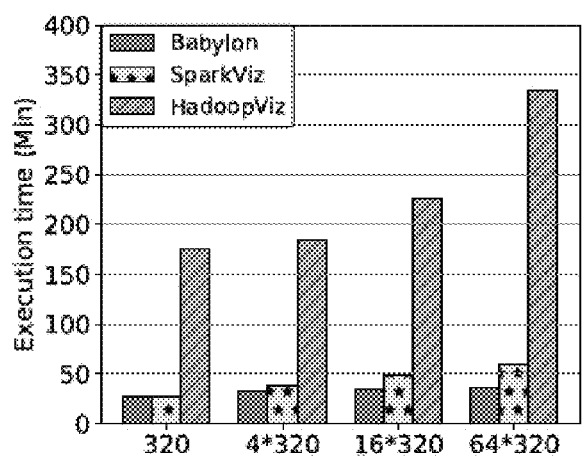
FIG. 12A is a scatter box showing the effect of the size of a query area.
Figure 12B:
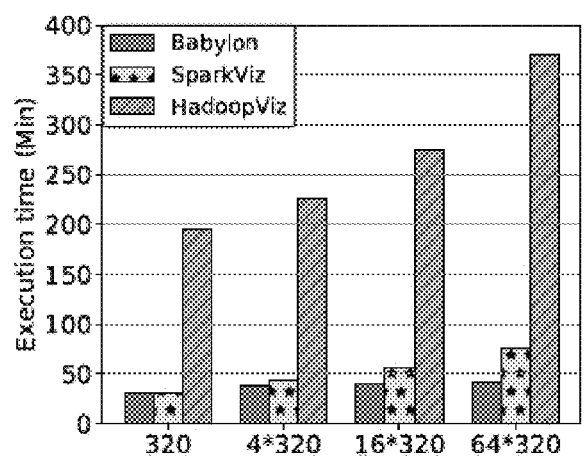
FIG. 12B is a heat map showing the effect of the size of a query area, according to aspects of the present disclosure.

As shown in FIGS. 12A and 12B, the execution time of all three compared approaches increases with the growth of query window area. However, SparkViz and HadoopViz cost more and more time on larger query area while the time cost of the GeoViz system increases slowly. On the largest query area, 64*320 km2, the GeoViz system is around 50% faster than SparkViz and 10 times faster than HadoopViz. This makes sense because the GeoViz system optimizer decides to first pixelize spatial objects and cache aggregated pixels into memory. The rest 4 GeoViz Query 1 in this workload work on the cached pixels and plot qualified pixels directly. It is worth noting that, for the smallest query window 320 km$^2$, the GeoViz system achieves the same performance with SparkViz because the GeoViz system optimizer actually chooses the naive plan shown in FIGS. 6A and 6B, which is same with SparkViz and HadoopViz. The optimized plan is not good for very small query windows (only return a few qualified records) because it has to pixelize all objects no matter how many objects are needed for visualization. But the GeoViz system optimizer is able to figure out the fastest plan for the given scenario.

Effect of Cluster Size

To demonstrate the scalability of the GeoViz system, its performance was tested on different cluster settings. The number of CPU cores was varied to be 6 cores, 12 cores and 24 cores. In order to make sure there is enough memory for processing intermediate data, the number of CPU cores registered in Apache Spark are changed without changing the number of workers.

Figure 13A:
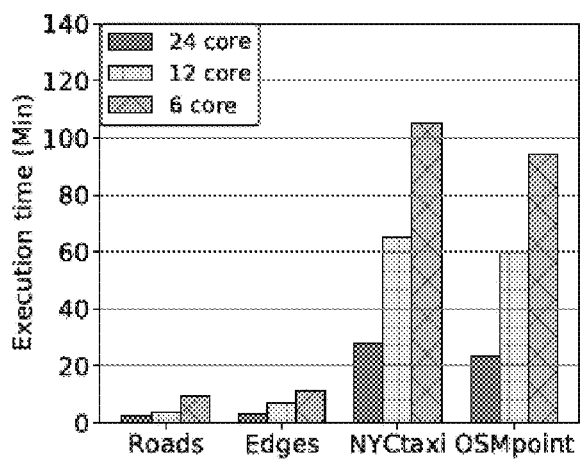
FIG. 13A is a scatter box showing MultiRange+MapViz on different CPU cores.
Figure 13B:
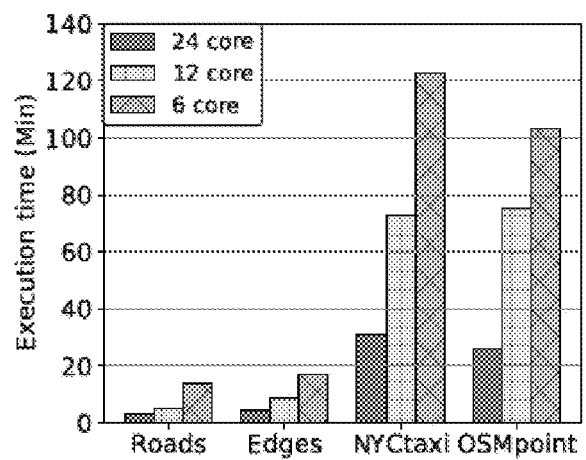
FIG. 13B is a heat map showing MultiRange+MapViz on different CPU cores, according to aspects of the present disclosure.
Figure 14A:
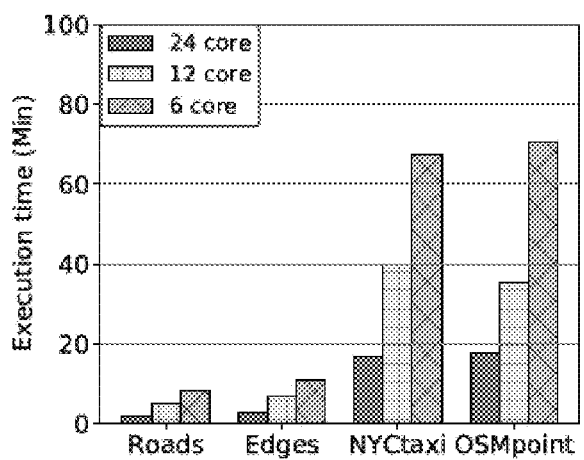
FIG. 14A is a scatter box showing Range+Join+MapViz on different CPU cores.
Figure 14B:
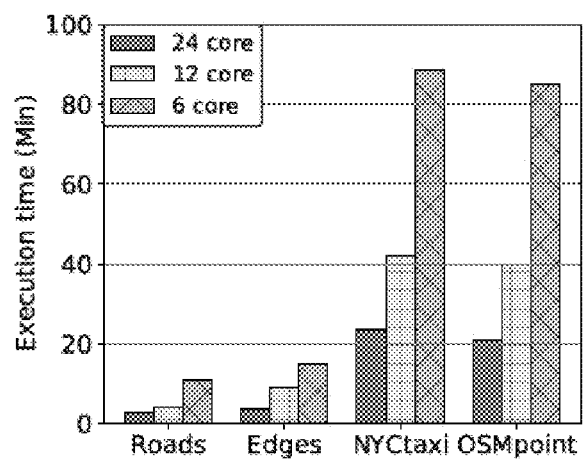
FIG. 14B is a heat map showing Range+Join+MapViz on different CPU cores, according to aspects of the present disclosure.

As depicted in FIGS. 13A/B and 14A/B, the time cost of BABYLON increases as the number of cores in the cluster decreases. That makes sense due to the fact that a larger cluster (more CPU cores) can process more tasks in parallel. On the other hand, in this case the experiments are run on four main datasets, Roads, Edges, NYCtaxi and OSMpoint (FIGS. 13A/B and 14A/B). The latter two datasets have over 1 billion records which are around 30 times larger than Edges and 70 times larger than Roads. The experiments also show that the time spent on large-scale datasets (NYCtaxi and OSMpoint) is only close to an order of magnitude (instead of 30-70 times) higher than that on smaller datasets. That makes sense because although the small datasets have much fewer records, their internal objects are line strings, which contain multiple line segments. Processing line strings including check spatial query predicate and pixelize takes more time due to their complex geometrical shape.

Impact of Map Zoom Level

Figure 15A:
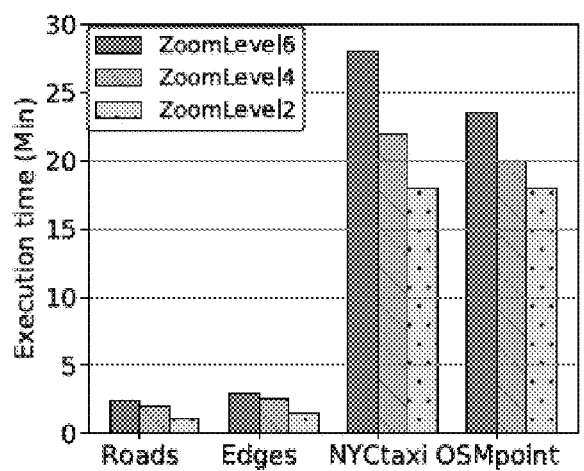
FIG. 15A is a graphical representation showing the impact of a map zoom level for Range+Viz.
Figure 15B:
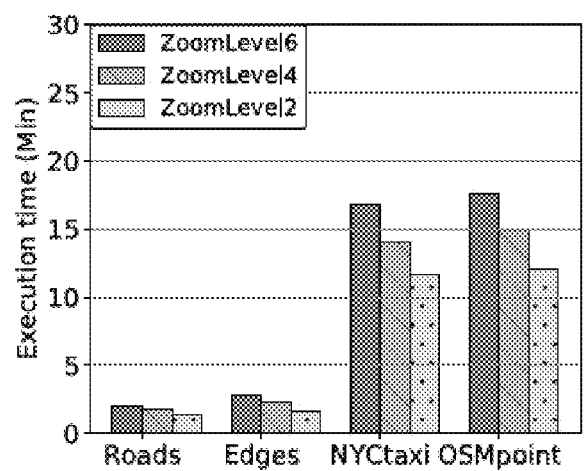
FIG. 15B is a graphical representation showing the impact of a map zoom level for Range+Viz, according to aspects of the present disclosure.

FIGS. 15A and 15B study the impact of different map zoom levels on the GeoViz system. OpenStreetMap standard zoom level was used as the criteria. Higher zoom level means that the GeoViz system produces more map tiles. A 256*256 pixel resolution was used for each map tile and the zoom level was varied to be L2, L4 and L6. OSM zoom level 2 has 64 tiles, 1 million pixels; level 4 stands for 256 tiles, 16 million pixels; level 6 demands 4096 tiles, 256 million pixels. The two GeoViz workloads (i.e., MultiRange+MapViz and Range+Join+Viz) are run on these map levels and produce scatter plots map visualization. As shown in FIGS. 15A and 15B, the higher the zoom level, the more time the GeoViz system takes to execute the GeoViz query. That makes sense because, with smaller zoom levels, The GeoViz system only generates low resolution map tiles. In that case, pixelize, pixel aggregate, and rendering operators process fewer pixels.

Figure 16:
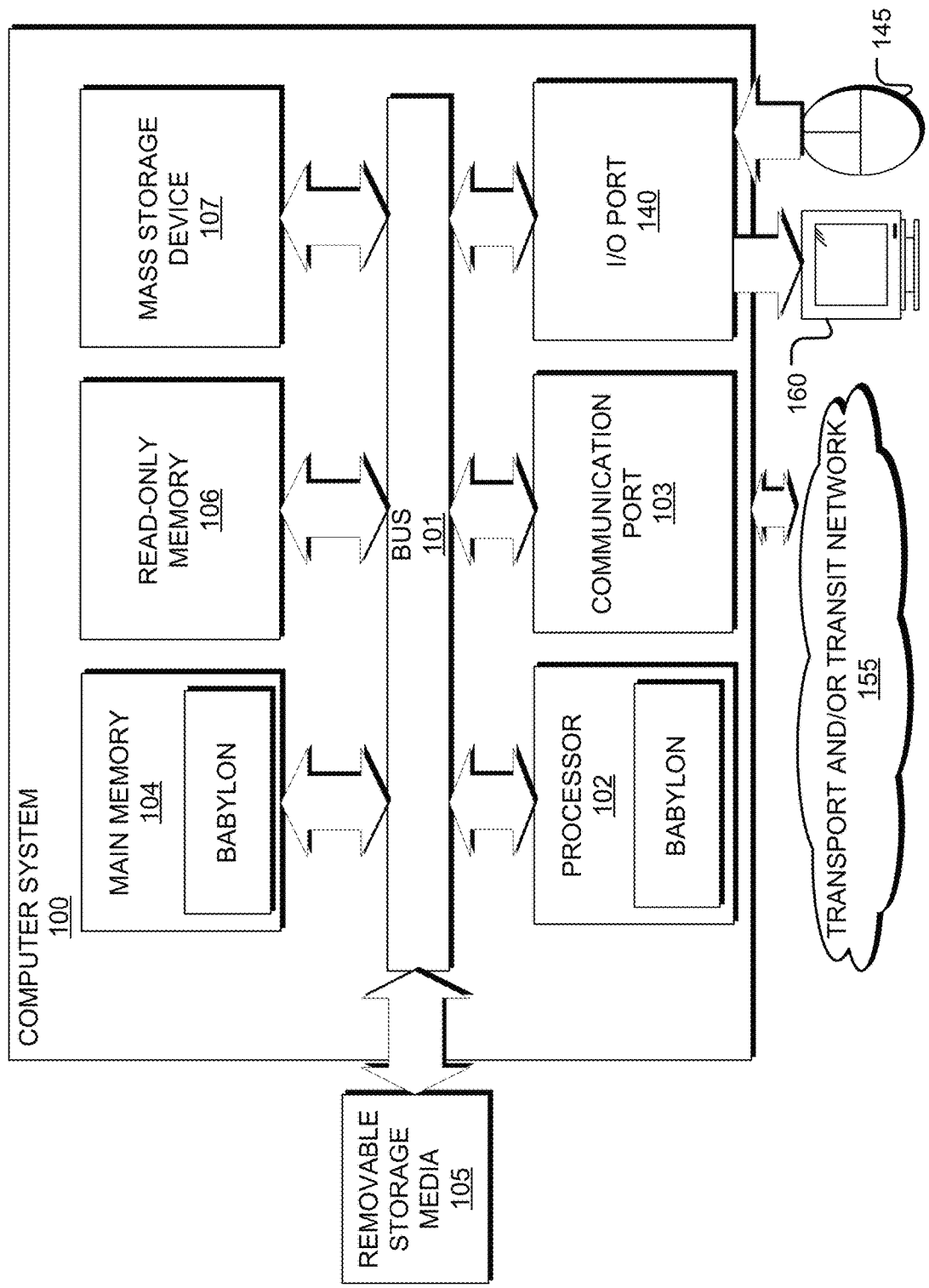
FIG. 16 is a simplified block diagram of a representative computing system that may employ the Babylon system, according to aspects of the present disclosure.

FIG. 16 is an example schematic diagram of a GeoViz computing system 100 (hereinafter "system 100") that may implement various methodologies discussed herein. For example, the system 100 may comprise a server used to execute aspects of the system 100 including the above mentioned subsystems that operate with the system 100. The system 100 includes a bus 101 (i.e., interconnect), at least one processor 102 or other computing element, at least one communication port 103, a main memory 104, a removable storage media 105, a read-only memory 106, and a mass storage device 107. Processor(s) 102 can be any known processor, such as, but not limited to, an Intel® Itanium® or Itanium 2® processor(s), AMD® Opteron® or Athlon MP® processor(s), or Motorola® lines of processors. Communication port 103 can be any of an RS-232 port for use with a modem based dial-up connection, a 10/100 Ethernet port, a Gigabit port using copper or fiber, or a USB port. Communication port(s) 103 may be chosen depending on a network such as a Local Area Network (LAN), a Wide Area Network (WAN), or any network to which the GeoViz system 100 connects. Computing system may further include a transport and/or transit network 155, a display screen 160, an I/O port 140, and an input device 145 such as a mouse or keyboard.

Main memory 104 can be Random Access Memory (RAM) or any other dynamic storage device(s) commonly known in the art. Read-only memory 106 can be any static storage device(s) such as Programmable Read-Only Memory (PROM) chips for storing static information such as instructions for processor 102. Mass storage device 107 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 101 communicatively couples processor(s) 102 with the other memory, storage, and communications blocks. Bus 101 can be a PCI/PCI-X, SCSI, or Universal Serial Bus (USB) based system bus (or other) depending on the storage devices used. Removable storage media 105 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 104 may be encoded with the system 100 including the various subsystems and related programs that supports the functionality discussed above. In other words, aspects of the system 100 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 102 accesses main memory 104 via the use of bus 101 in order to launch, run, execute, interpret or otherwise perform processes, such as through logic instructions, executing on the processor 102 and based on the instructions of the system 100 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules, e.g. modules that execute instructions related to the operation of the GeoViz system 100. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for a computer-implemented system associated with geovisualization analytics, comprising:
configuring a computing device, for:
combining data preparation and map visualization for a spatial dataset in a same distributed cluster of nodes such that the data preparation and map visualization is co-optimized in a distributed and parallel data system, by executing a query language that defines a plurality of operators configured for application to the spatial dataset, the plurality of operators integrally including database query operators for data preparation and map visualization operators for map visualization, the plurality of operators including a partitioner operator that fragments a given pixel dataset across the same distributed cluster such that pixels that fall inside a logical space partition go to a same physical data partition and stay at a common machine;
accessing a query, the query referencing the spatial dataset and an attribute associated with the spatial dataset and further defining one or more functions; and
returning a set of map tiles associated with a subset of the spatial dataset that satisfies the query, including implementing a pixelize operator process to return the set of map tiles for visualization, comprising:
inputting the spatial dataset,
creating a list L in a format including a pixel and an initial aggregate, the list L being initially empty, and
generating a distributed dataset defined by L, by, for each spatial object in a data partition associated with the spatial dataset
coordinating transformation on all vertexes,
transformation on all vertexes,
decomposing each object into line segments,
finding all pixels mapped by line segments or points, and
placing pixels and their initial aggregate in the List L.

2. The method of claim 1, wherein the one or more functions are predefined and associated with respective visual effects.

3. The method of claim 2, further comprising:
visualizing the set of map tiles associated with a subset of the spatial dataset along a display device and the respective visual effects associated with the one or more functions defined by the query.

4. The method of claim 1, further comprising:
creating a new function and a corresponding visualization effect based on information of the query.

5. The method of claim 1, wherein the query is a SQL query that defines a SELECT, FROM, and WHERE clause.

6. The method of claim 1, further comprising:
executing a first operator for mapping spatial objects to corresponding pixels of the set of map tiles for visualization along a display;
executing a second operator for calculating a user-defined aggregate value for each pixel to determine an intensity of each pixel corresponding to each of the set of map tiles; and
executing a third operator for determining a color for each pixel corresponding to each of the set of map tiles according to the user-defined aggregate value for rendering an image associated with the query as applied to the spatial dataset.

7. The method of claim 1, wherein the spatial dataset is partitioned and distributed among a plurality of cluster nodes.

8. A computer-implemented system for geovisualization analytics, comprising:
a cluster of nodes associated with at least one processor;
a spatial dataset associated with the cluster of nodes;
a plurality of operators associated with the spatial dataset, the plurality of operators integrally including database query operators for data preparation and map visualization operators for map visualization including a pixelize operator such that spatial data preparation and map visualization associated with the spatial dataset is combined in the cluster of nodes;

a spatial partitioner that fragments the spatial dataset across the cluster of nodes and balances load among the cluster of nodes such that pixels that fall inside a logical space partition go to a same physical data partition and stay at a common machine; and an optimizer that takes an input a task and generates an execution plan that co-optimizes the plurality of operators.

9. The computer-implemented system of claim 8, wherein execution of each of the plurality of operators is parallelized among the cluster of nodes.

10. The computer-implemented system of claim 8, wherein the plurality of operators comprises a pixelize query operator, a pixel aggregate query operator, a render query operator and an overlay query operator.

* * * * *